(12) United States Patent  
Kondo (10) Patent No.: US 8,184,185 B2
(45) Date of Patent: May 22, 2012

(54) SOLID-STATE IMAGING APPARATUS

(75) Inventor: Toru Kondo, Hino (JP)

(73) Assignee: Olympus Corporation, Tokyo (JP)

( * ) Notice: Subject to any disclaimer, the term of this patent is extended or adjusted under 35 U.S.C. 154(b) by 484 days.

(21) Appl. No.: 12/482,832

(22) Filed: Jun. 11, 2009

(65) Prior Publication Data

US 2009/0310005 A1   Dec. 17, 2009

(30) Foreign Application Priority Data

Jun. 17, 2008   (JP) .................................. 2008-157549

(51) Int. Cl.
*H04N 3/14* (2006.01)
*H04N 5/335* (2006.01)
*H01L 31/062* (2006.01)
*H01L 31/113* (2006.01)

(52) U.S. Cl. ........................................ 348/294; 348/308
(58) Field of Classification Search ................ 348/222.1, 348/294–324; 250/208.1; 257/291–293
See application file for complete search history.

(56) References Cited

U.S. PATENT DOCUMENTS

| | | | | |
|---|---|---|---|---|
| 6,483,541 B1 * | 11/2002 | Yonemoto et al. | ............ | 348/302 |
| 6,560,369 B1 * | 5/2003 | Sato | ............ | 382/239 |
| 6,982,759 B2 * | 1/2006 | Goto | ............ | 348/302 |
| 2002/0001037 A1 * | 1/2002 | Miyawaki et al. | ............ | 348/302 |
| 2003/0117510 A1 * | 6/2003 | Sakurai et al. | ............ | 348/308 |
| 2003/0164887 A1 * | 9/2003 | Koizumi et al. | ............ | 348/308 |
| 2005/0247941 A1 * | 11/2005 | Adachi | ............ | 257/72 |
| 2007/0222876 A1 * | 9/2007 | Yonemoto | ............ | 348/294 |

FOREIGN PATENT DOCUMENTS

JP   2007-19580 A   1/2007

* cited by examiner

*Primary Examiner* — Nhan T Tran
*Assistant Examiner* — Tuan Le
(74) *Attorney, Agent, or Firm* — Westerman, Hattori, Daniels & Adrian, LLP (57) ABSTRACT

A solid-state imaging apparatus including: a pixel section having a plurality of pixels arranged into two dimensions for converting an incident light into a signal electric charge and for outputting an electrical signal corresponding to the signal electric charge; vertical signal lines for reading the signals of the pixel section column by column; a horizontal signal line for reading the signals through switches from the vertical signal lines; and a variable amplification section for reading the signal from the horizontal signal line with amplifying it by a predetermined amplification factor, and further includes a control section for effecting a control so that a signal level on the horizontal signal line does not exceed a predetermined limit level when signals are read out from the vertical signal lines to the horizontal signal line.

2 Claims, 8 Drawing Sheets

SOLID-STATE IMAGING APPARATUS

This application claims benefit of Japanese Patent Application No. 2008-157549 filed in Japan on Jun. 17, 2008, the contents of which are incorporated by this reference.

BACKGROUND OF THE INVENTION

The present invention relates to MOS type solid-state imaging apparatus having a variable amplification function.

Figure 1:
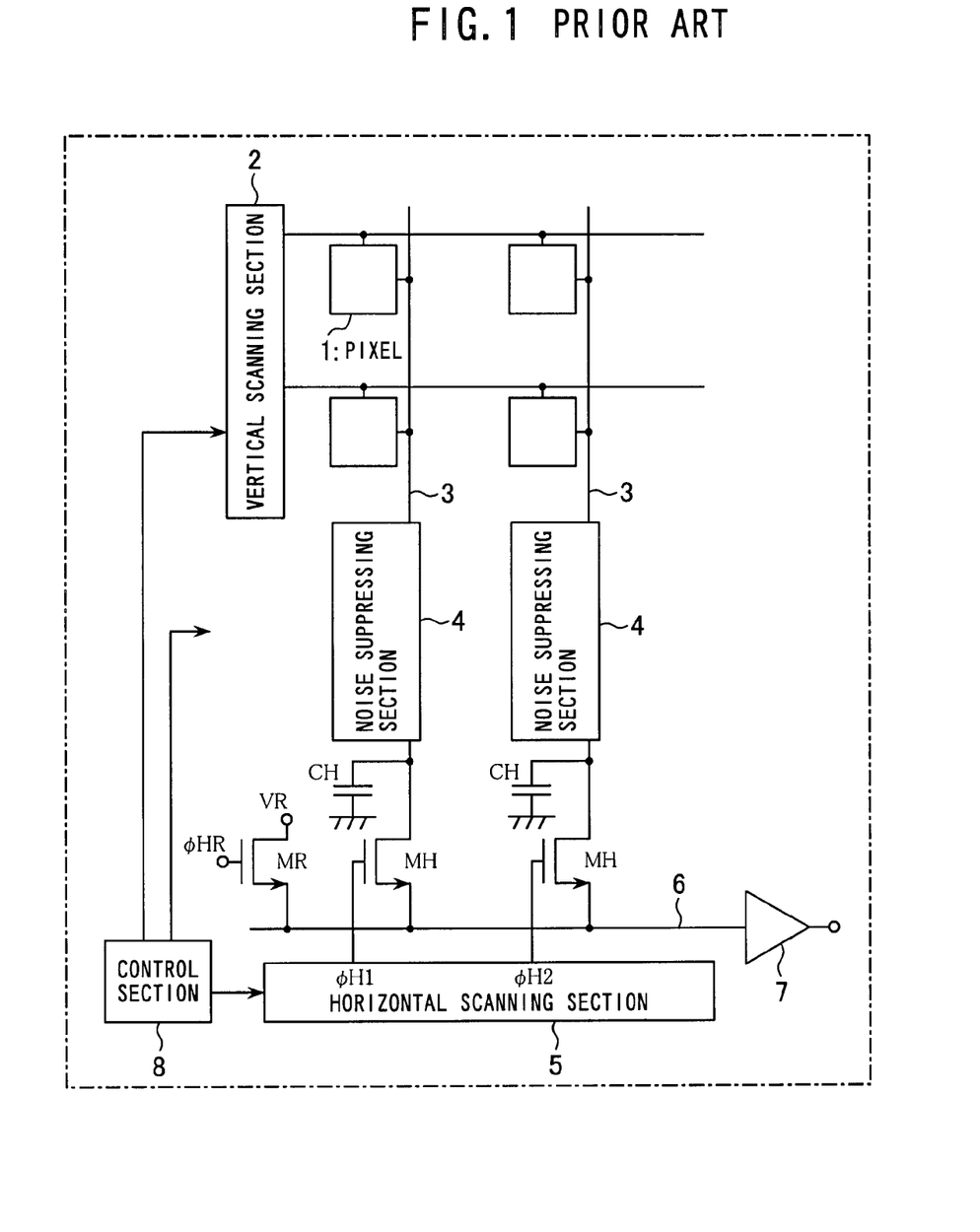
FIG. 1 is a circuit diagram showing partially in blocks the construction of a prior-art solid-state imaging apparatus.

In recent years, MOS (Metal Oxide Semiconductor) type solid-state imaging apparatus are drawing attention. The construction of such prior-art solid-state imaging apparatus and its timing of operation for reading signal will be described below with reference to one disclosed in Japanese Patent Application Laid-Open 2007-19580. FIG. 1 is a conceptual drawing showing the construction of the solid-state imaging apparatus disclosed in the publication. The solid-state imaging apparatus according to this prior-art example includes: a pixel section having pixels 1 arranged into a matrix from which electrical signal corresponding to amount of light incident in a predetermined period is outputted; vertical signal lines 3 through which signals from the pixel section are read out by the unit of row; a vertical scanning section 2 for inputting control signals by the unit of row to the pixel section; noise suppressing sections 4 connected to the vertical signal lines 3 respectively, to suppress noise components contained in signal from the pixel section; a hold capacitor CH for retaining signal after the noise suppression; horizontal signal line read switches MH for sequentially reading out the signal retained at the hold capacitors CH to a horizontal signal line 6; a horizontal scanning section 5 for supplying horizontal select pulses φH1 to φH2 to the horizontal signal line read switches MH; a horizontal signal line reset switch MR for resetting an electric potential on the horizontal signal line 6 to a horizontal signal line reset voltage VR; an output amplifier 7 for amplifying the potential on the horizontal signal line 6 by a predetermined amplification factor; and a timing control section 8 for supplying a horizontal reset control pulse φHR to the horizontal signal line reset switch MR and for supplying control pulses to the vertical scanning section 2, the noise suppressing section 4, and the horizontal scanning section 5.

Figure 2:
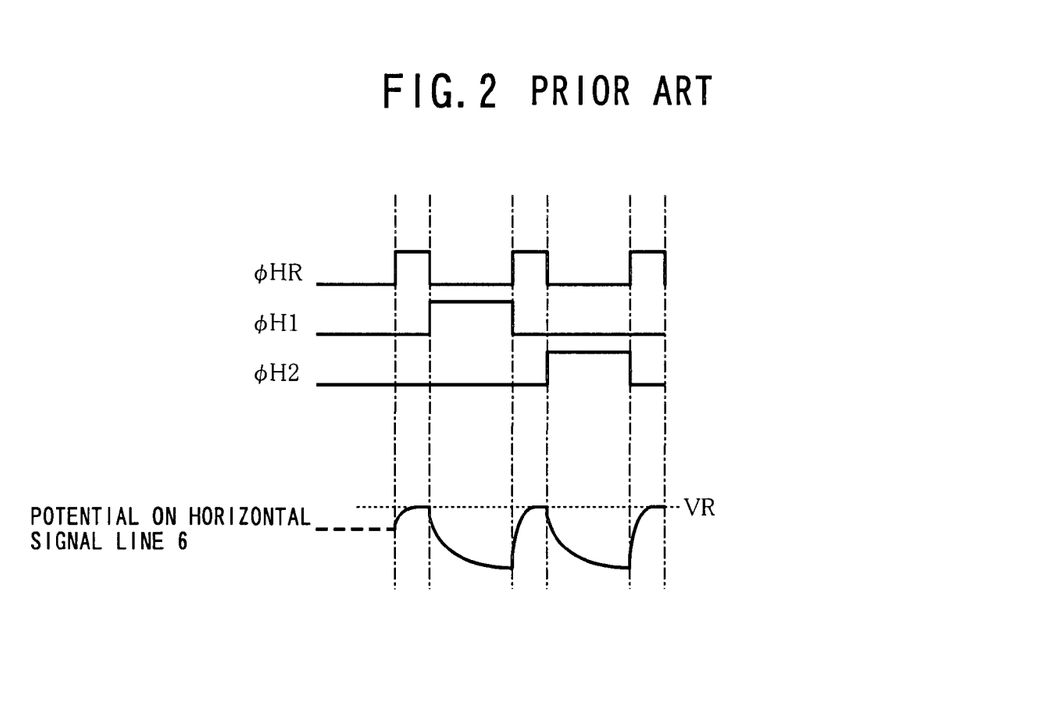
FIG. 2 is a timing chart for explaining an operation of the prior-art example shown in FIG. 1.

FIG. 2 is a timing chart showing an operation of the prior-art solid-state imaging apparatus shown in FIG. 1. Shown here is the timing at which pixel signals after noise suppression accumulated at the hold capacitors CH are read out to the horizontal signal line 6. At first, the horizontal reset control pulse φHR is driven to H level to reset the horizontal signal line 6 to the horizontal signal line reset voltage VR. Then, after bringing the horizontal reset control pulse φHR to L level, the horizontal select pulse φH1 is driven to H level to read the pixel signal retained at the hold capacitor CH of the first column to the horizontal signal line 6. It is assumed here that the larger the pixel signal the lower the potential on the horizontal signal line 6. Next, after bringing the horizontal select pulse ?H1 to L level, the horizontal reset control pulse φHR is driven to H level again to reset the horizontal signal line 6. Then, after bringing the horizontal reset control pulse φHR to L level, the horizontal select pulse φH2 is driven to H level to read the pixel signal retained at the hold capacitor CH of the second column to the horizontal signal line 6. By repeating control in this manner, the signals on each column are sequentially read out to the horizontal signal line 6. The pixel signals read out to the horizontal signal line 6 are amplified by a predetermined amplification factor at the output amplifier 7 and then are outputted.

Figure 3A:
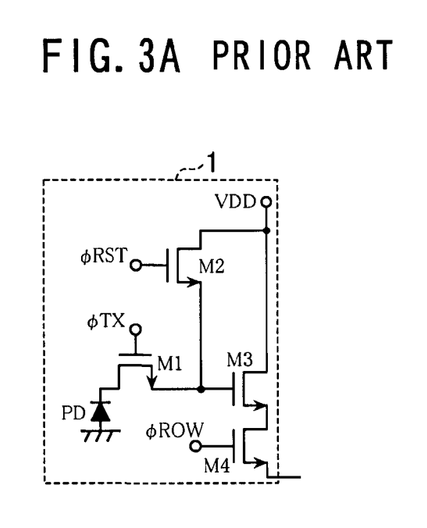
FIGS. 3A and 3B are circuit diagrams for showing construction of the pixel and the noise suppressing section in the prior-art example shown in FIG. 1.

The operation for reading pixel signal to the hold capacitor CH for example may be an operation with the pixel construction and the construction of the noise suppressing section as shown in FIGS. 3A and 3B. As shown in FIG. 3A, each pixel 1 includes: a photodiode PD for changing an incident light into an electrical signal; a transfer transistor M1 for transferring the electrical signal accumulated at the photodiode PD; an amplification transistor M3 for amplifying the transferred electrical signal; a reset transistor M2 for resetting an electric potential for example of an gate electrode of the amplification transistor M3; and a row select transistor M4 for selectively outputting amplified signal based on the electrical signal. A transfer pulse φTX, a reset pulse φRST, and a row select pulse φROW are inputted by the unit of row from the vertical scanning section 2 respectively to the gate of the transfer transistor M1, the reset transistor M2, and the row select transistor M4. Further, a pixel power supply VDD is connected to the drain of the reset transistor M2 and the amplification transistor M3.

Figure 3B:
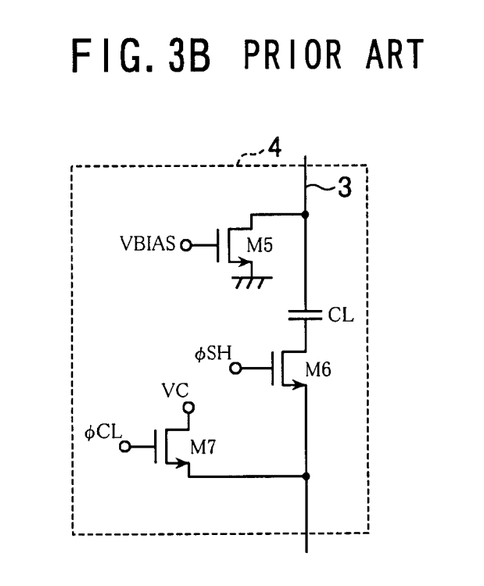

The noise suppressing section 4 as shown in FIG. 3B includes: a bias transistor M5 for flowing a constant current to the vertical signal line 3; a clamp capacitor CL and clamp transistor M7 for clamping pixel signal; and a sample-and-hold transistor M6 for retaining signal after noise suppression. A clamp pulse φCL is supplied to the gate of the clamp transistor M7, and a sample-and-hold pulse φSH to the gate of the sample-and-hold transistor M6. Further, a bias voltage VBIAS is supplied to the gate of the bias transistor M5, and a clamp voltage VC to the drain of the clamp transistor M7.

Figure 4:
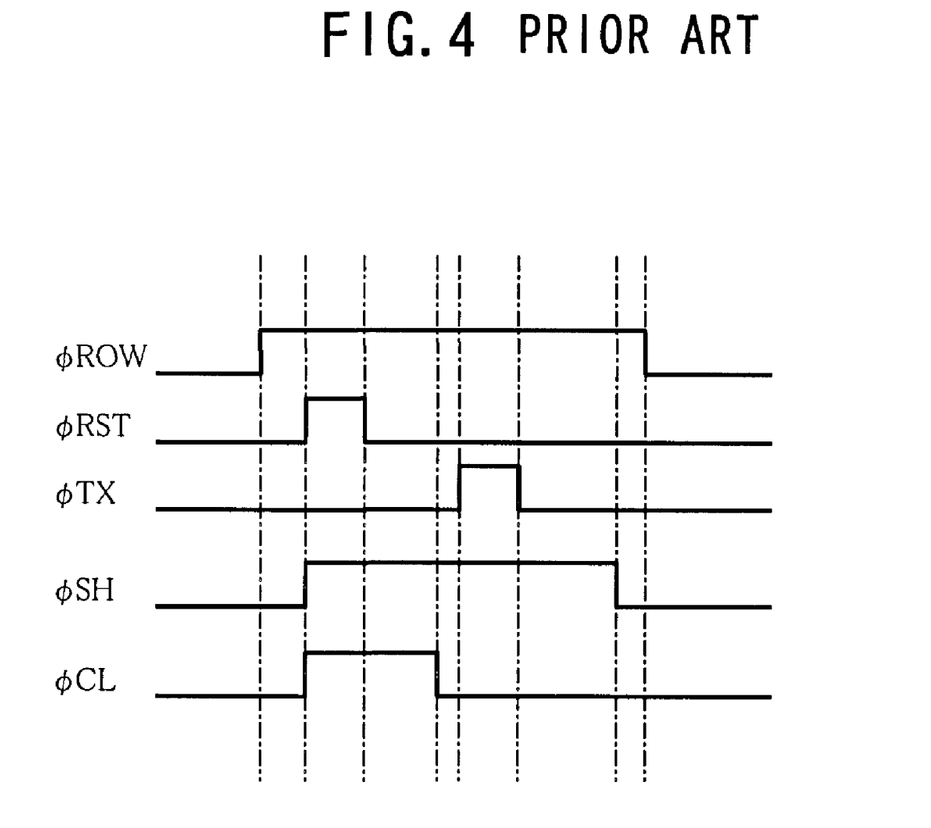
FIG. 4 is a timing chart for explaining an operation of the pixel and the noise suppressing section shown in FIGS. 3A and 3B.

FIG. 4 is a timing chart for showing operation for reading signal of the pixel section constructed as in FIG. 3A and the noise suppressing operation by the noise suppressing section constructed as in FIG. 3B. At first, the row select pulse φROW is driven to H level whereby a portion of the pixel section corresponding to one row is selected and signals of the selected row are read out to the vertical signal line 3. Next, the reset pulse φRST is driven to H level to reset the gate potential of the amplification transistors M3 of the selected row whereby the reset potential of pixel is outputted to the vertical signal line 3. At this time, the sample-and-hold pulse φSH is maintained at H level and the clamp pulse φCL at H level at the noise suppressing section 4 so as to connect the noise suppressing section 4 to the vertical signal line 3 and at the same time to clamp an output of the noise suppressing section 4 to the clamp potential VC.

Next, after completing reset of each pixel 1 by bringing the reset pulse φRST to L level, the clamp pulse φCL is brought to L level to end the clamping operation at the noise suppressing section 4. Next, the transfer pulse φTX is driven to H level so that signal electric charges generated in a predetermined period at the photodiode PD are transferred to the gate of the amplification transistor M3.

A signal potential corresponding to signal electric charges generated at the photodiode PD is thereby outputted to the vertical signal line 3, and, even when the transfer pulse φTX is brought to L level, signal potential corresponding to signal electric charges generated at the photodiode PD is continuously outputted to the vertical signal line 3. At this time, the output of the noise suppressing section 4 is changed from the clamp potential VC corresponding to a change from the reset potential to the signal potential of the pixel 1. The noise components contained in the reset potential and the signal potential are thereby subtracted. Finally, the noise suppressing operation is completed by bringing the sample-and-hold pulse φSH to L level, and then the row select pulse φROW is brought to L level to electrically disconnect the selected row from the vertical signal line 3.

The reading of pixel signal and the noise suppressing operation are rendered as the above so that pixel signal after noise suppression is retained at the hold capacitor CH.

SUMMARY OF THE INVENTION

In a first aspect of the invention, there is provided a solid-state imaging apparatus including: a pixel section having a plurality of pixels arranged into two dimensions for converting an incident light into a signal electric charge and for outputting an electrical signal corresponding to the signal electric charge; vertical signal lines for reading the signals of the pixel section column by column; a horizontal signal line for reading the signals through switches from the vertical signal lines; and a variable amplification section for reading the signal from the horizontal signal line with amplifying it by a predetermined amplification factor. It further includes a control section for effecting a control so that a signal level on the horizontal signal line does not exceed a predetermined limit level when signals are read out from the vertical signal lines to the horizontal signal line.

In a second aspect of the invention, the control section in the solid-state imaging apparatus according to the first aspect further includes a reset section for resetting the horizontal signal line, and effects the control through the reset section so that the signal level on the horizontal signal line does not exceed the predetermined limit level when signals are read out to the horizontal signal line.

In a third aspect of the invention, the reset section in the solid-state imaging apparatus according to the second aspect is formed of an NMOS transistor, wherein the horizontal signal line is reset by inputting a reset pulse to a gate of the NMOS transistor, and wherein the limit level of the signal level on the horizontal signal line is changed by changing Low level of the reset pulse.

In a fourth aspect of the invention, the control section in the solid-state imaging apparatus according to the first aspect effects the control through the switches so that the signal level on the horizontal signal line does not exceed the predetermined limit level when signals are read out from the vertical signal lines to the horizontal signal line.

In a fifth aspect of the invention, the switch in the solid-state imaging apparatus according to the fourth aspect is formed of a PMOS transistor, wherein the control section reads the signals from the vertical signal lines to the horizontal signal line by inputting a signal reading pulse to the PMOS transistor, and wherein the limit level of the signal level on the horizontal signal line is changed by changing Low level of the signal reading pulse.

DESCRIPTION OF THE PREFERRED EMBODIMENTS

Some embodiments of the solid-state imaging apparatus according to the invention will be described below with reference to the drawings.

Embodiment 1

A first embodiment of the solid-state imaging apparatus according to the invention will now be described.

Figure 5:
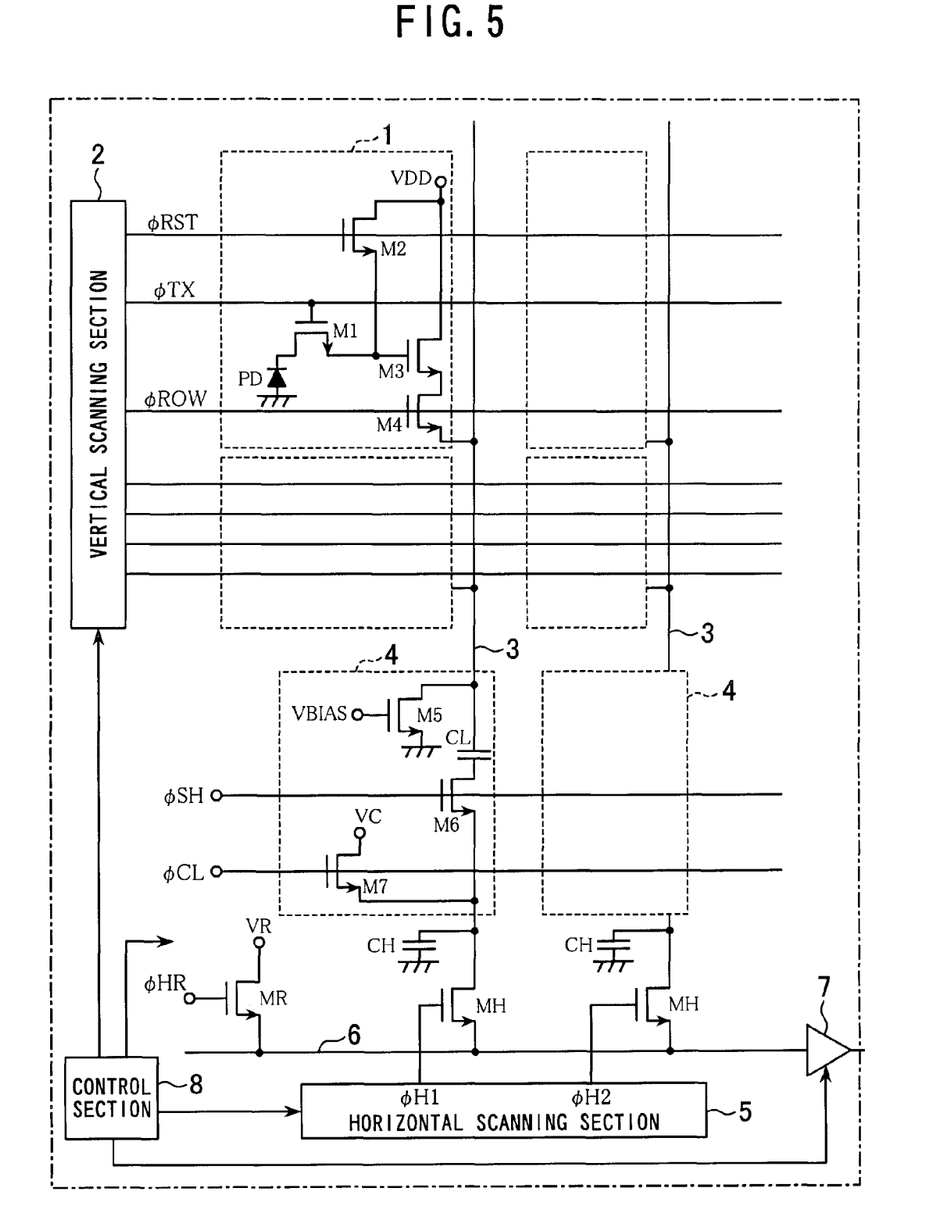
FIG. 5 is a circuit diagram showing partially in blocks the construction of a first embodiment of the solid-state imaging apparatus according to the invention.

FIG. 5 schematically shows the construction of MOS type solid-state imaging apparatus according to the first embodiment of the invention. Like components as in the prior-art example shown in FIG. 1 and FIGS. 3A, 3B are denoted by like symbols. The MOS solid-state imaging apparatus according to the present embodiment includes: a pixel section having pixels 1 arranged into a matrix from which an electrical signal corresponding to an amount of a light incident in a predetermined period is outputted; vertical signal lines 3 through which signals from the pixel section are read out by the unit of row; a vertical scanning section 2 for inputting control signals by the unit of row to the pixel section; noise suppressing sections 4 for suppressing noise components contained in signal from the pixel section; hold capacitors CH for retaining signal after noise suppression; horizontal signal line read switches MH for sequentially reading out the signals retained at the hold capacitors CH to a horizontal signal line 6; a horizontal scanning section 5 for supplying horizontal select pulses φH1 to φH2 to the horizontal signal line read switches MH; a horizontal signal line reset switch MR for resetting an electric potential on the horizontal signal line 6 to a horizontal signal line reset voltage VR; an output amplifier 7 for amplifying the potential on the horizontal signal line 6 by a predetermined amplification factor; and a control section 8 for supplying a horizontal reset control pulse φHR to the horizontal signal line reset switch MR, for supplying control pulses to the vertical scanning section 2, the noise suppressing section 4, and the horizontal scanning section 5, and for setting amplification factor at the output amplifier 7.

Each pixel 1 includes: a photodiode PD for changing an incident light into an electrical signal; a transfer transistor M1 for transferring the electrical signal accumulated at the photodiode PD; an amplification transistor M3 for amplifying the transferred electrical signal; a reset transistor M2 for resetting an electrical potential for example of an gate electrode of the amplification transistor M3; and a row select transistor M4 for selectively outputting the amplified signal based on the electrical signal. A transfer pulse φTX, a reset pulse φRST, a row select pulse φROW are inputted by the unit of row from the vertical scanning section 2 respectively to the gate of the transfer transistor M1, the reset transistor M2, and the row select transistor M4. Further, a pixel power supply VDD is connected to the drain of the reset transistor M2 and the amplification transistor M3.

The noise suppressing section 4 includes: a bias transistor M5 for flowing a constant current to the vertical signal line 3; a clamp capacitor CL and clamp transistor M7 for clamping pixel signal; and a sample-and-hold transistor M6 for retaining a signal after noise suppression. A clamp pulse φCL is supplied to the gate of the clamp transistor M7, and a sample-and-hold pulse φSH to the gate of the sample-and-hold transistor M6. Further, a bias voltage VBIAS is supplied to the gate of the bias transistor M5, and a clamp voltage VC to the drain of the clamp transistor M7.

Figure 6A:
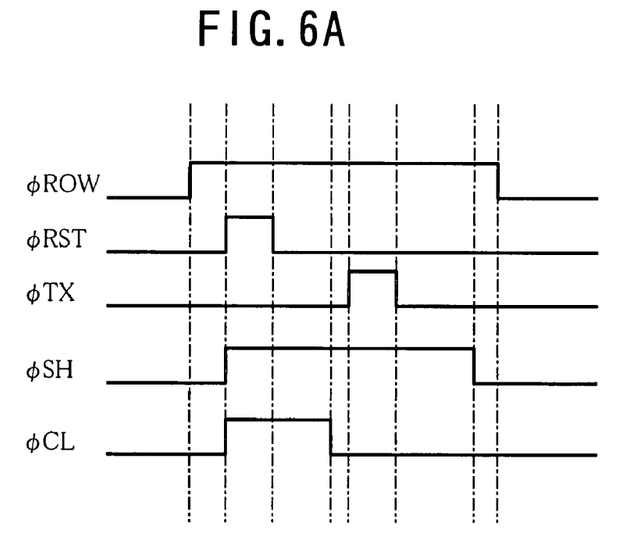
FIGS. 6A and 6B are timing charts for explaining an operation of the first embodiment shown in FIG. 5.
Figure 6B:
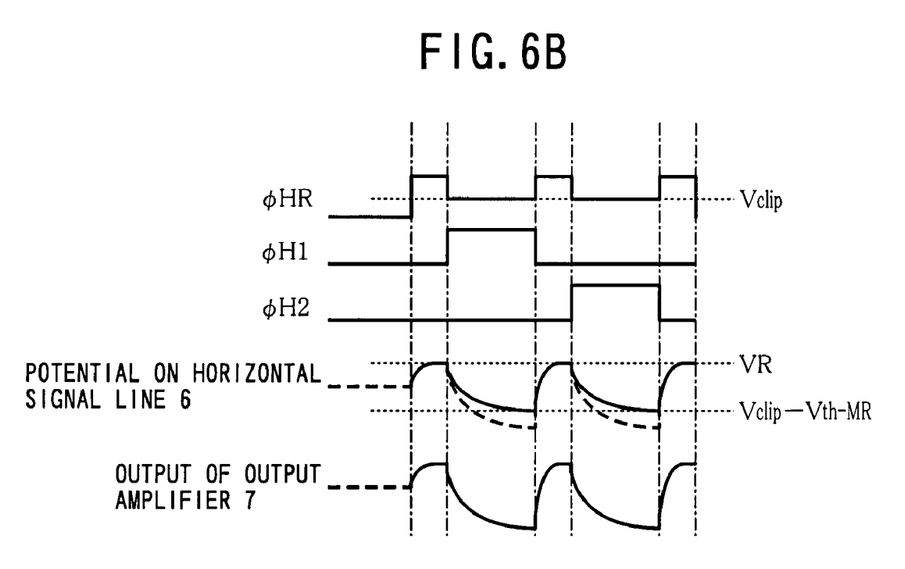

FIGS. 6A and 6B are timing charts for explaining an operation of the solid-state imaging apparatus according to the first embodiment having the above construction. At first as shown in the timing chart of FIG. 6A, the reading and the noise suppressing operation of pixel signal from the pixel section are performed and the pixel signals after noise suppression are retained at the hold capacitor CH. The operation in this respect is identical to the prior-art example. Specifically at first, a portion of the pixel section corresponding to one row is selected by driving the row select pulse φROW to H level, and the signals of the selected row are respectively read out to the vertical signal lines 3. Next, the reset pulse φRST is driven to H level to reset the gate potential of the amplification transistor M3 of the selected row, and the reset potentials of pixel are respectively outputted to the vertical signal lines 3. At this time, at the noise suppressing section 4, the sample-and-hold pulse φSH is maintained at H level and the clamp pulse φCL at H level so as to connect the noise suppressing section 4 to the vertical signal line 3 and to clamp an output of the noise suppressing section 4 by a clamp potential VC. Next, after completing reset of each pixel 1 by bringing the reset pulse φRST to L level, the clamp pulse φCL is brought to L level to end the clamping at the noise suppressing section 4.

Next, the transfer pulse φTX is driven to H level so that signal electric charges generated in a predetermined period at the photodiode PD are transferred to the gate of the amplification transistor M3. A signal potential corresponding to signal electric charges generated at the photodiode PD is thereby outputted to the vertical signal line 3, and, even when the transfer pulse φTX is brought to L level, the signal potential corresponding to signal electric charges generated at the photodiode PD is continuously outputted to the vertical signal line 3. At this time, the output of the noise suppressing section 4 is changed from the clamp potential VC corresponding to a change from the reset potential to the signal potential at the pixel 1. The noise components contained in the reset potential and the signal potential are thereby subtracted. Finally, the noise suppressing operation is completed by bringing the sample-and-hold pulse φSH to L level, and then the row select pulse φROW is brought to L level to electrically disconnect the pixels of the selected row from the vertical signal lines 3. The reading of pixel signal and the noise suppressing operation are rendered as the above so that the pixel signal after noise suppression is retained at the hold capacitor CH.

Next as shown in the timing chart of FIG. 6B, the signals retained at the hold capacitors CH of each column are read out to the horizontal signal line 6. At first, the horizontal signal line reset pulse φHR is driven to H level to reset the horizontal signal line 6 to the horizontal signal line reset voltage VR. Next, the level of the horizontal reset control pulse φHR is brought to an intermediate value Vclip between H level and L level, and then in this condition, the horizontal select pulse φH1 is driven to H level to read out to the horizontal signal line 6 the pixel signal after noise suppression retained at the hold capacitor CH.

While an electric potential on the horizontal signal line 6 at this time falls correspondingly to the pixel signal, since the horizontal signal line reset transistor MR is turned ON when the potential on the horizontal signal line 6 becomes lower than Vclip−Vth-MR (Vth-MR being a threshold voltage of the horizontal signal line reset transistor MR), the potential on the horizontal signal line 6 is limited at Vclip−Vth-MR. Accordingly, when the horizontal select pulse φH1 is brought to L level and the horizontal reset control pulse φHR to H level next time to reset the horizontal signal line 6 again, a potential difference between the potential on the horizontal signal line 6 and the reset potential VR becomes smaller so that a reset deficiency on the horizontal signal-line 6 does not occur. When a reading at high rate, therefore, an image quality deterioration due to the reset deficiency at the time of the resetting of the horizontal signal line because of lack of responsiveness on the horizontal signal line is not resulted.

The potential on the horizontal signal line 6 is amplified by the output amplifier 7 and then outputted. Accordingly, as shown in FIG. 6B, the output of the output amplifier 7 is obtained as a sufficient output even when the potential on the horizontal signal line 6 is limited. The limiting level of the horizontal signal line 6 can be changed by changing the intermediate value Vclip of the horizontal reset control pulse φHR outputted from the control section 8, i.e. by changing L level of the horizontal reset control pulse φHR. For this reason, by changing the above described intermediate value Vclip correspondingly to the amplification factor of the output amplifier 7 which is to be set also from the control section 8, a sufficient output is obtained as the output of the output amplifier 7 even when an amplitude on the horizontal signal line 6 is limited. It should be noted that the limiting level of signal level on the horizontal signal line 6 in this case is set so that an amplification output signal limited by the limiting level and amplified at the output amplifier 7 attains a maximum value in the output range of the output amplifier 7.

Embodiment 2

Figure 7:
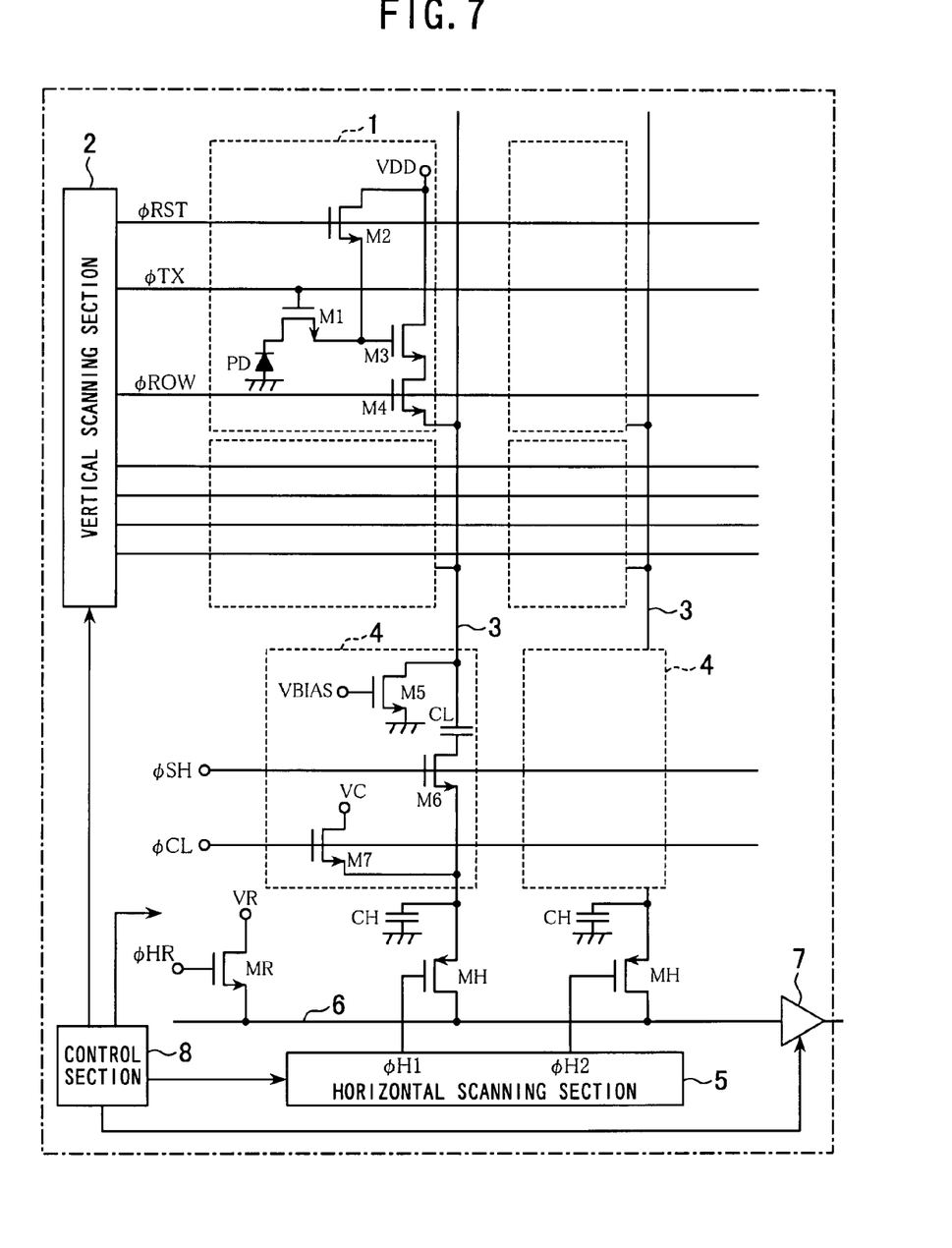
FIG. 7 is a circuit diagram showing partially in blocks the solid-state imaging apparatus according to a second embodiment.
Figure 8:
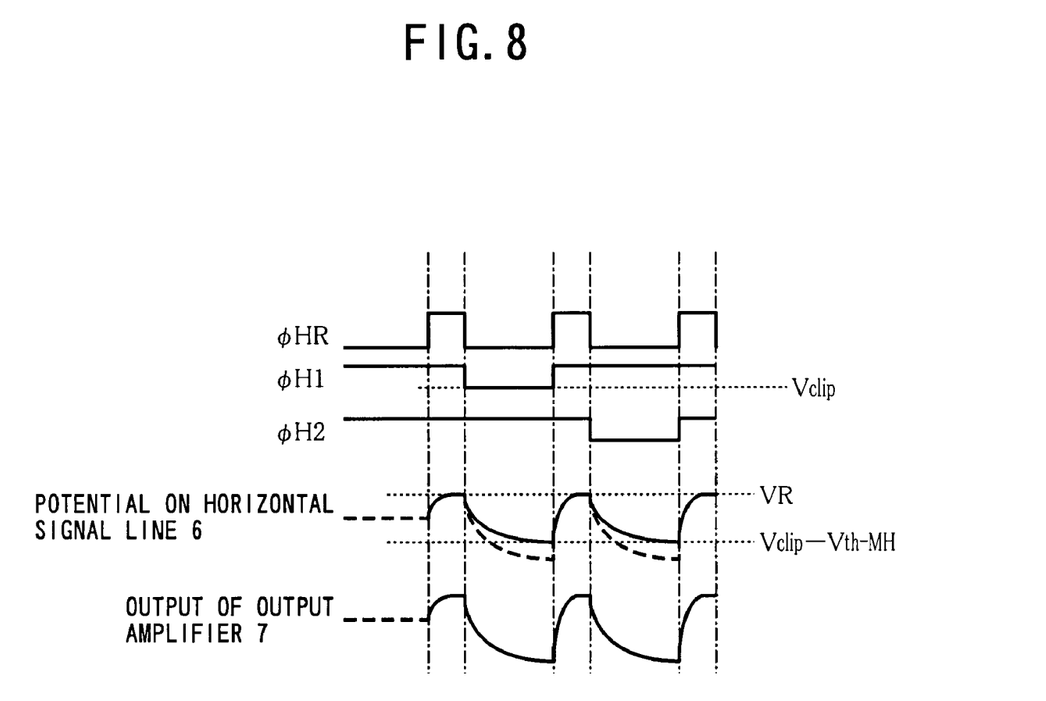
FIG. 8 is a timing chart for explaining an operation of the second embodiment shown in FIG. 7.

FIG. 7 is a conceptual drawing showing construction of a second embodiment of the invention. In the present embodiment, the horizontal signal line read switch MH in the first embodiment shown in FIG. 5 is formed of a PMOS transistor instead of NMOS transistor; the construction of the rest is identical to the first embodiment and like components are denoted by like symbols. FIG. 8 is a timing chart for explaining an operation of the second embodiment.

Since the reading of pixel signal and the noise suppressing operation are similar to the operation of the first embodiment shown in FIG. 6A, a description will be given below only with respect to operation where pixel signals after noise suppression retained at the hold capacitor CH are read out to the horizontal signal line 6.

At first, the horizontal reset control pulse φHR is driven to H level so that the horizontal signal line 6 is reset to the horizontal signal line reset voltage VR. Next, the horizontal select pulse φH1 is set to Vclip which is lower than H level whereby the pixel signal retained at the hold capacitor CH of the first column is outputted to the horizontal signal line 6. While an electric potential on the horizontal signal line 6 at this time falls correspondingly to the pixel signal, since the horizontal signal line read switch MH is turned OFF when the potential on the horizontal signal line 6 becomes lower than Vclip−Vth-MH (Vth-MH being a threshold voltage of the horizontal signal line read switch MH), the potential on the horizontal signal line 6 is limited at Vclip−Vth-MH.

Accordingly, after turning OFF the horizontal signal read switch MH next time by driving the horizontal select pulse φH1 to H level, when the horizontal reset control pulse φHR is driven to H level to reset the horizontal signal line 6 again, a potential difference between the potential on the horizontal signal line 6 and the reset potential VR becomes smaller so that a reset deficiency on the horizontal signal line 6 does not occur and image quality deterioration is not resulted.

The potential on the horizontal signal line 6 is amplified by the output amplifier 7 and then outputted. Accordingly, even when the potential on the horizontal signal line 6 is limited as shown in FIG. 8, a sufficient output can be obtained as the output of the output amplifier 7. The limiting level on the horizontal signal line 6 can be changed by changing Vclip which is lower than H level of the horizontal select pulses φH1 and φH2 that are outputted from the horizontal scanning section 5 controlled by the control section 8, i.e. by changing L level of the horizontal select pulses φH1 and φH2. For this reason, even when an amplitude on the horizontal signal line 6 is limited, a sufficient output can be obtained as the output of the output amplifier 7 by changing Vclip correspondingly to the amplification factor of the output amplifier 7 which is also set by the control section 8.

Figure 9:
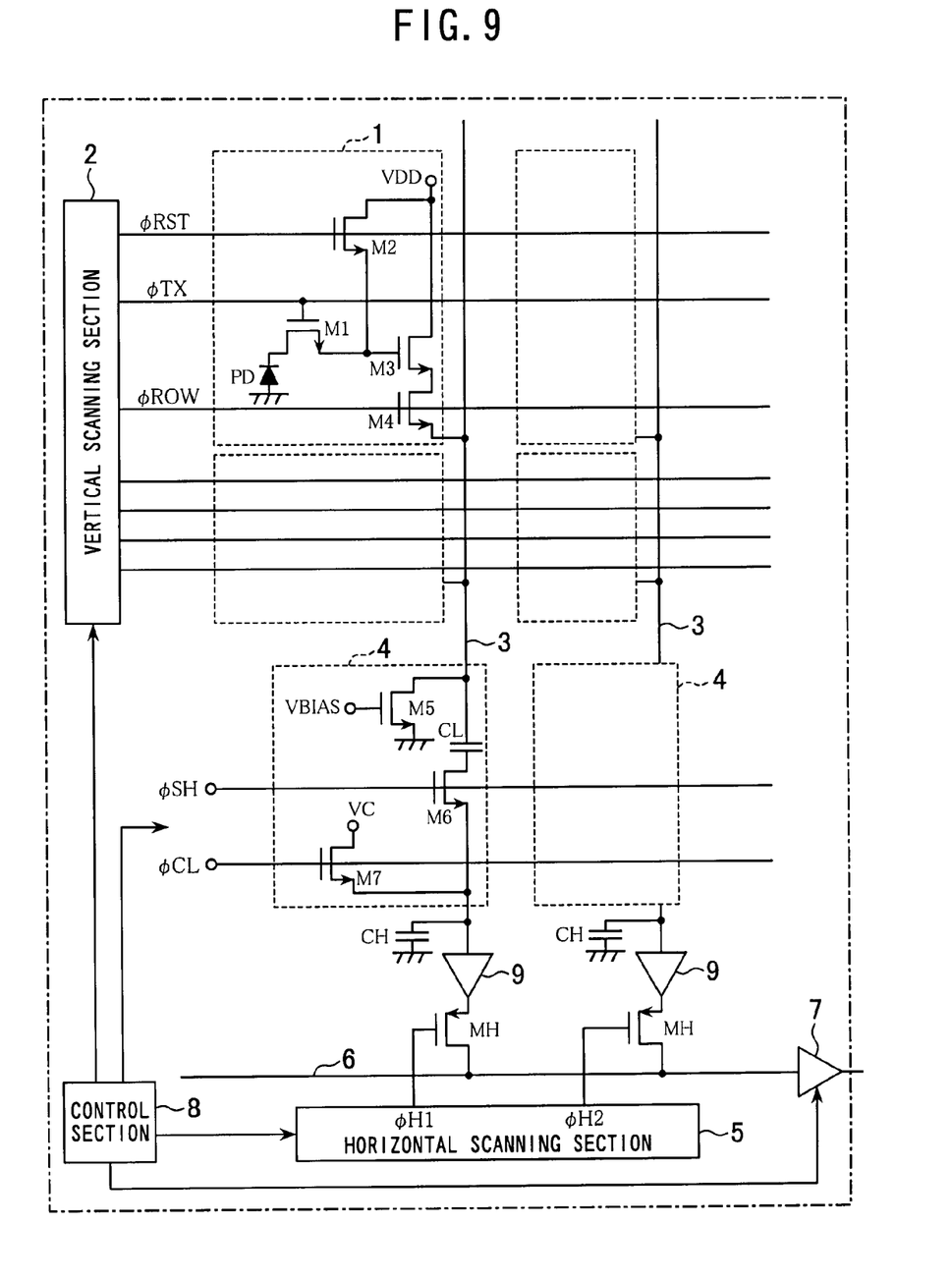
FIG. 9 is a circuit diagram showing partially in blocks a modification of the second embodiment shown in FIG. 7.

With the present embodiment, the output of the column circuit can be limited also when a column output driver 9 is provided for example as shown in FIG. 9 at the output of each column circuit. In this case, image deterioration due to lack of responsiveness on the horizontal signal line 6 that occurs because of large difference between column signals can be suppressed when signals are successively read out without resetting the horizontal signal line 6.

While drive methods for limiting the amplitude of electric potential on the horizontal signal line 6 have been described in the first and second embodiments, it is possible with using construction other than the above to limit the amplitude when signals are read out from each column circuit to the horizontal signal line 6 correspondingly to the amplification factor at the output amplifier 7. Further, while the first and second embodiments have been described as those having the output amplifier 7 to amplify an analog signal, similar advantages can be obtained for those having a means for amplifying a signal after A/D conversion by changing the limiting level on the horizontal signal line 6 correspondingly to such amplification factor.

According to the invention as has been described by way of the above embodiments, since a control is effected so that the signal level on the horizontal signal line does not exceed a predetermined limiting level when pixel signals are read out to the horizontal signal line, the solid-state imaging apparatus can be achieved as capable of suppressing the image deterioration that occurs due to lack of responsiveness on the horizontal signal line.

What is claimed is:

1. A solid-state imaging apparatus comprising:
a pixel section having a plurality of pixels arranged into two dimensions for converting an incident light into a signal electric charge and for outputting an electrical signal corresponding to said signal electric charge;
vertical signal lines for reading the signals of said pixel section column by column;
a horizontal signal line for reading the signals through switches from said vertical signal lines; and
a variable amplification section for reading the signal from said horizontal signal line with amplifying it by a predetermined amplification factor;
said apparatus further comprising a control section for effecting a control so that a signal level on said horizontal signal line does not exceed a predetermined limit level when signals are read out from said vertical signal lines to said horizontal signal line,
wherein said control section further comprises a reset section for resetting said horizontal signal line, and effects the control through said reset section so that the signal level on said horizontal signal line does not exceed the predetermined limit level when signals are read out to said horizontal signal line; and
wherein said reset section comprises an NMOS transistor, wherein said horizontal signal line is reset by inputting a reset pulse to a gate of said NMOS transistor, and wherein the limit level of the signal level on said horizontal signal line is changed by changing Low level of said reset pulse.

2. The solid-state imaging apparatus comprising:
a pixel section having a plurality of pixels arranged into two dimensions for converting an incident light into a signal electric charge and for outputting an electrical signal corresponding to said signal electric charge;
vertical signal lines for reading the signals of said pixel section column by column;
a horizontal signal line for reading the signals through switches from said vertical signal lines; and
a variable amplification section for reading the signal from said horizontal signal line with amplifying it by a predetermined amplification factor;
said apparatus further comprising a control section for effecting a control so that a signal level on said horizontal signal line does not exceed a predetermined limit level when signals are read out from said vertical signal lines to said horizontal signal line;
wherein said control section effects the control through said switches so that the signal level on said horizontal signal line does not exceed the predetermined limit level when signals are read out from said vertical signal lines to said horizontal signal line; and
wherein said switch comprises a PMOS transistor, wherein said control section reads the signals from said vertical signal lines to said horizontal signal line by inputting a signal reading pulse to said PMOS transistor, and wherein the limit level of the signal level on said horizontal signal line is changed by changing Low level of said signal reading pulse.

* * * * *